United States Patent [19]

Koumoto et al.

[11] Patent Number: 5,247,624
[45] Date of Patent: Sep. 21, 1993

[54] MICROPROGRAM CONTROLLER INCLUDING LEADING MICROINSTRUCTION FROM A GENERATOR EXECUTED WHILE SUCCEEDING MICROINSTRUCTION FROM MEMORY IS READ OUT

[75] Inventors: Yasuhiko Koumoto; Kouji Maemura, both of Tokyo, Japan

[73] Assignee: NEC Corporation, Japan

[21] Appl. No.: 491,952

[22] Filed: Mar. 12, 1990

[30] Foreign Application Priority Data

Mar. 10, 1989 [JP] Japan ............................ 1-58727
Mar. 22, 1989 [JP] Japan ............................ 1-71208

[51] Int. Cl.⁵ .......................................... G06F 9/22
[52] U.S. Cl. .................... 395/375; 364/262.5; 364/262.7; 364/262.8; 364/262.9; 364/259; 364/DIG. 1
[58] Field of Search ........................ 395/375, 775

[56] References Cited

U.S. PATENT DOCUMENTS

| | | | |
|---|---|---|---|
| 4,674,063 | 6/1987 | Sato | 395/375 |
| 4,812,972 | 3/1989 | Chastain | 395/375 |
| 4,873,629 | 10/1989 | Harris et al. | 395/375 |
| 5,113,503 | 5/1992 | Sasaki et al. | 395/375 |

FOREIGN PATENT DOCUMENTS

0087785 9/1983 European Pat. Off.
0136183 4/1985 European Pat. Off.

Primary Examiner—Parshotam S. Lall
Assistant Examiner—Ayni Mohamed
Attorney, Agent, or Firm—Whitham & Marhoefer

[57] ABSTRACT

A microprogram controller advances the initiation of a string of microinstructions for certain macroinstructions to enhance the overall speed of instruction execution. The microprogram controller includes a memory (50) for storing microinstructions and a generator (30) for generating an initial microinstruction of a certain macroinstruction. A selector (60) selects one of a microinstruction read out of the memory and the initial microinstruction from the generator and latches the selected microinstruction in a microinstruction register (70). The initial microinstruction from the generator is first latched into the register and executed while a succeeding microinstruction is read out of the memory.

4 Claims, 10 Drawing Sheets

MI1 (STEP1): TA= SRC; TB= DST; ALU (TA, TB);

MI2 (STEP2): DST= ALU0; ENDM;

MI10 (STEP1): TA= MODREG; INCDEC(TA)

MI11 (STEP2) MODREG= ALU0; RESTART;

MICROPROGRAM CONTROLLER INCLUDING LEADING MICROINSTRUCTION FROM A GENERATOR EXECUTED WHILE SUCCEEDING MICROINSTRUCTION FROM MEMORY IS READ OUT

BACKGROUND OF THE INVENTION

The present invention relates to a microprocessor and, more particularly, to a microprocessor executing a microprogram (called hereinafter "microprogram controller") based on a received macroinstruction.

In a microprogram controller, each of instructions to be executed is programmed by a user as a form of macroinstruction and is performed in the microprogram controller after being converted into a string of microinstructions corresponding to the received macroinstruction. The respective strings of microinstructions corresponding to all the possible macroinstructions are preliminarily stored or written into a microinstruction memory. Each of the macroinstructions has a specific address information for designating a leading microinstruction of the corresponding string of microinstruction.

Specifically, the address information peculiar to the macroinstruction to be executed is loaded to a microaddress register and is used to access the microinstruction memory for reading out a microinstruction therefrom. The read/out microinstruction is then latched in a microinstruction register and executed by a microinstruction execution control unit. When the microinstruction read out of the memory is latched in the microinstruction register, the content of the microaddress register is updated by one, so that a next microinstruction is read out of a next address of the memory. This next microinstruction is latched in the microinstruction register and executed by the execution control unit after the execution of the current microinstruction is completed. When the execution of the string of microinstruction corresponding to the current macroinstruction is completed, the address information of a new macroinstruction to be executed next is loaded to the microaddress register.

Thus, the string of microinstructions corresponding to the macroinstruction to be executed is initiated after the content of the microaddress register is settled by being loaded with the address information of the macroinstruction to be executed and the leading microinstruction is read out of the memory. The actual start of executing the string of microinstructions is thereby delayed and the completion of the string of microinstructions is delayed accordingly.

SUMMARY OF THE INVENTION

Therefore, an object of the present invention is to provide an improved microprogram controller.

Another object of the present invention is to provide a microprogram controller in which the initiation of a string of microinstructions is advanced to enhance the overall speed of instruction execution.

A microprogram controller according to the present invention comprises a memory for storing macroinstructions, a first register for temporarily storing address information for accessing the memory, a second register for temporarily storing a microinstruction to be executed, an execution control unit for receiving and executing a microinstruction from the second register, a fixed-instruction generator for generating a leading microinstruction of a predetermined string of microinstructions, a selector for selecting one of a microinstruction read out of the memory and the leading microinstruction generated from the fixed-microinstruction generator, and a sequence control unit for loading the leading microinstruction to the second register through the selector before a second microinstruction of the predetermined string of microinstructions is read out of the memory by the first register being loaded with predetermined address information, the sequence control unit loading the second microinstruction from the memory to the second register through the selector after the leading microinstruction is loaded.

Thus, the second microinstruction and, if present, later instruction(s) of the predetermined string of microinstructions are stored in the memory, and the leading microinstruction thereof generated like a constant from the generator is loaded to the second register so as to save the period required for reading out the microinstruction from the memory. Accordingly, the initiation of actually executing the string of microinstructions is accelerated and the instruction execution speed is enhanced correspondingly.

BRIEF DESCRIPTION OF THE DRAWINGS

The above and other objects, of the present invention will be more apparent from the following-description taken in conjunction with the accompanying drawings, in which.

DETAILED DESCRIPTION OF THE EMBODIMENTS

Figure 1:
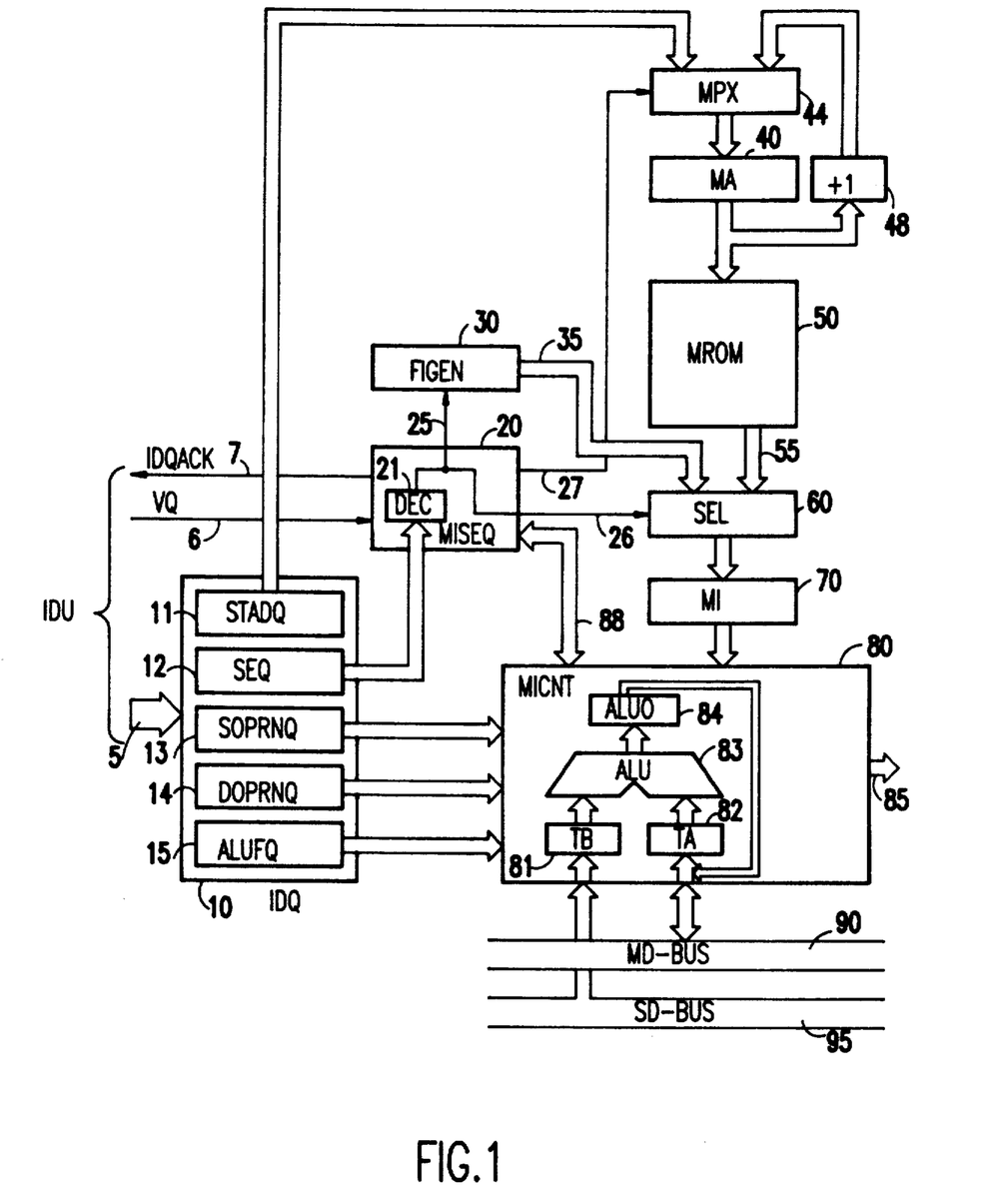
FIG 1 is a block diagram representative of a first embodiment of the present invention.

Referring to FIG. 1, there is shown a microprogram controller according to a first embodiment of the present invention. A macroinstruction is decoded by an instruction decoder unit (IDU), which is not shown in the drawings, and the decoded information thereof is supplied via a bus 5 to a decoded instruction queue (IDQ) 10 and then stored therein. In detail, stored in IDQ 10 are address information (STADQ) 11 for accessing a microinstruction memory (MROM) 50, source operand information (SOPRNQ) 13, destination operand information (DOPRNQ) 14 and operational information (ALUFQ) 15 for designating an operation on one or two operand data, each information being derived from the macroinstruction to be executed. In accordance with the present invention, further stored in IDQ 10 is sequence control information (SEQ) 12 representing whether or not the macroinstruction to be executed is performed by a typical string of microinstructions which will be described later. When all of the information are ready in IDQ 10, IDU changes a valid signal (VQ) 6 to an active high level to inform a microinstruction sequencer (MISEQ) 20 of this fact. Under the condition of the execution of microinstructions being enabled, MISEQ 20 returns an acknowledge signal (IDACK) 7 to inform IDU of receiving the information from IDQ 10. MISEQ 20 further loads STADQ 11 to a microaddress register (MA) 40 via a multiplexer (MPX) 44 to access MROM 50 with STADQ 11. The content of MA 40 is updated by one by an incrementer 48 and then returned to MA 40. Thus, respective addresses for a string of microinstructions consisting of three or more steps are designated to access MROM 50.

The microinstruction read out of MROM 50 is supplied via a bus 55 to one input of a selector (SEL) 60 having the other input supplied via a bus 35 with a microinstruction generated by a fixed-microinstruction generator (FIGEN) 30 which is provided in accordance with the present invention. FIGEN 30 is controlled by MISEQ 20 and generates the microinstruction that is a leading or first microinstruction of the typical string of microinstructions. SEL 60 selects one of the microinstructions from the buses 35 and 55 in response to a selection signal 26 from MISEQ 20. The selected microinstruction is latched in a microinstruction register (MI) 70 and then supplied to and executed by a microinstruction execution control unit (MICNT) 80. MICNT 80 generates a set of control signals 85 for reading and writing operand data and includes an arithmetic and logic unit (ALU) 83 for performing an arithmetic and-/or logic operation on one or two operand data supplied thereto, input registers (TA and TB) 82 and 81 for temporarily storing source and destination operand data, respectively, and an output register (ALUO) 84 for temporarily storing resultant data from ALU 83. Control information such as an execution start signal and an execution-completion signal of microinstructions and so forth is transmitted via a control bus 88 between MISEQ 20 and MICNT 80. SOPRNQ 13, DOPRNQ 14 and ALUFQ 15 in IDU 10 are supplied to MICNT 80.

In the present embodiment, the typical string of microinstructions, the leading microinstruction of which is generated by FIGEN 30, is such that the source operand data designated by SOPRNQ 13 and the destination operand data designated by DOPRNQ 14 are transferred respectively via a first bus (MD-BUS) 90 and a second bus (SD-BUS) 95 and then subjected to the operation designated by ALUFQ 15 and the operation resultant data is thereafter returned to the operand designated by DOPRNQ 14. Such a microinstruction string is shown in FIG. 3.

Figure 3:
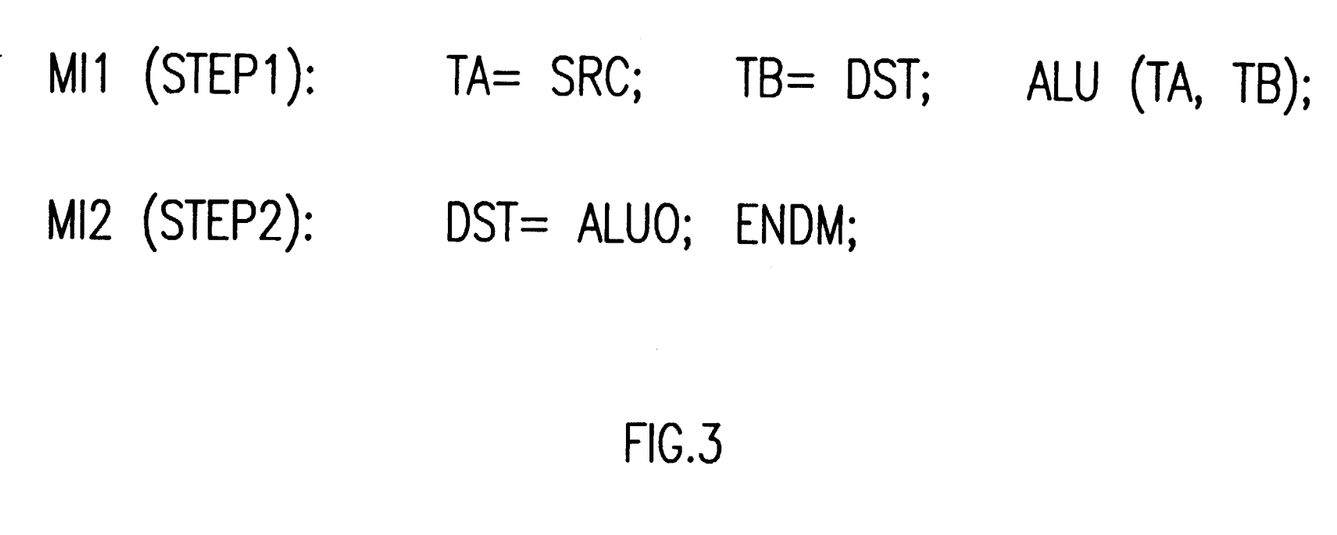
FIG. 3 is a program diagram indicating a string of microinstructions, the leading microinstruction of which is generated by FIGEN shown in FIG. 1.

In FIG. 3, "SRC" represents a source operand designated by SOPRNQ 13; "DST" represents a destination operand designated by DOPRNQ 14; "ALU" represents a command for setting ALU 83 with an operation designated by ALUFQ 105; "="represents a transmission command; and "ENDM" represents a control command for terminating the execution of the microinstruction string. Specifically, in the first step STEP1 by the leading microinstruction MI1, the source and destination operand data are transferred respectively to TA 82 and TB 81; ALU 83 performs the designated operation on these operand data; and the operation resultant data is stored in ALUO 84. Thereafter, in the second step STEP2 by the second microinstruction MI2, the data stored in ALUO 84 is transferred to the destination operand, so that the execution of this microinstruction string is completed. In the present embodiment, therefore FIGEN 30 generates the leading microinstruction MI1 and MROM 50 stores the second microinstruction MI2.

Figure 2:
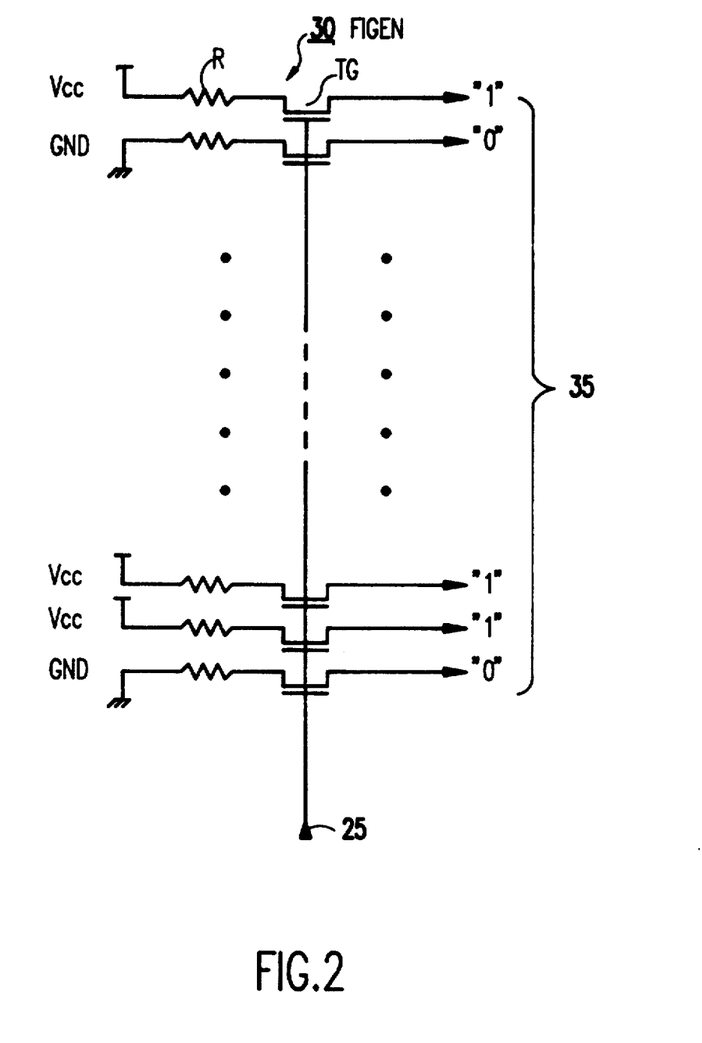
FIG. 2 is an internal circuit diagram representative of a fixed-instruction generator (FIGEN) shown in FIG. 1.

Referring to FIG. 2, FIGEN 30 includes a plurality pairs of a transfer gate TG and a resistor R, the number of which is the same as the number of bits required for the leading microinstruction MI1. One end of each of the transfer gates TG is connected via the corresponding resistor R to a positive power voltage Vcc as logic 1 or the ground voltage GND as logic 0, and the other end thereof is connected to SEL 60 as one bit of bus 35. The respective transfer gates TG are made open by an active high signal 25 from MISEQ 20, so that FIGEN 30 supplies a machine code of the heading microinstruction MI1 to SEL 60.

In operation, assume that the macroinstruction to be executed is an addition instruction of two operand data, which is therefore performed by the execution of the microinstruction string shown in FIG. 3. When this addition macroinstruction is decoded, IDU stores in IDQ 10 as STADQ 11 address information designating an address ADDO of MROM 50 into which the second microinstruction MI2 is written and as ALUFQ 15 addition operation information. Since this macroinstruction is performed by the typical microinstruction string shown in FIG. 3, "execution-enable" information is further stored in IDQ 10 as SEQ 12. Moreover, operand information representing whether the operand to be processed is a memory operand or a register operand and data length information denoting the data length of the operand to be processed are stored in IDQ 10 as SOPRNQ 13 and DOPRNQ 14. It should be noted that, as well known in the art, an effective address of the operand to be processed is previously obtained by an effective address generator (not shown) and the required operand data are stored in operand registers (also not shown) coupled to the buses 90 and 95, respectively.

Figure 4:
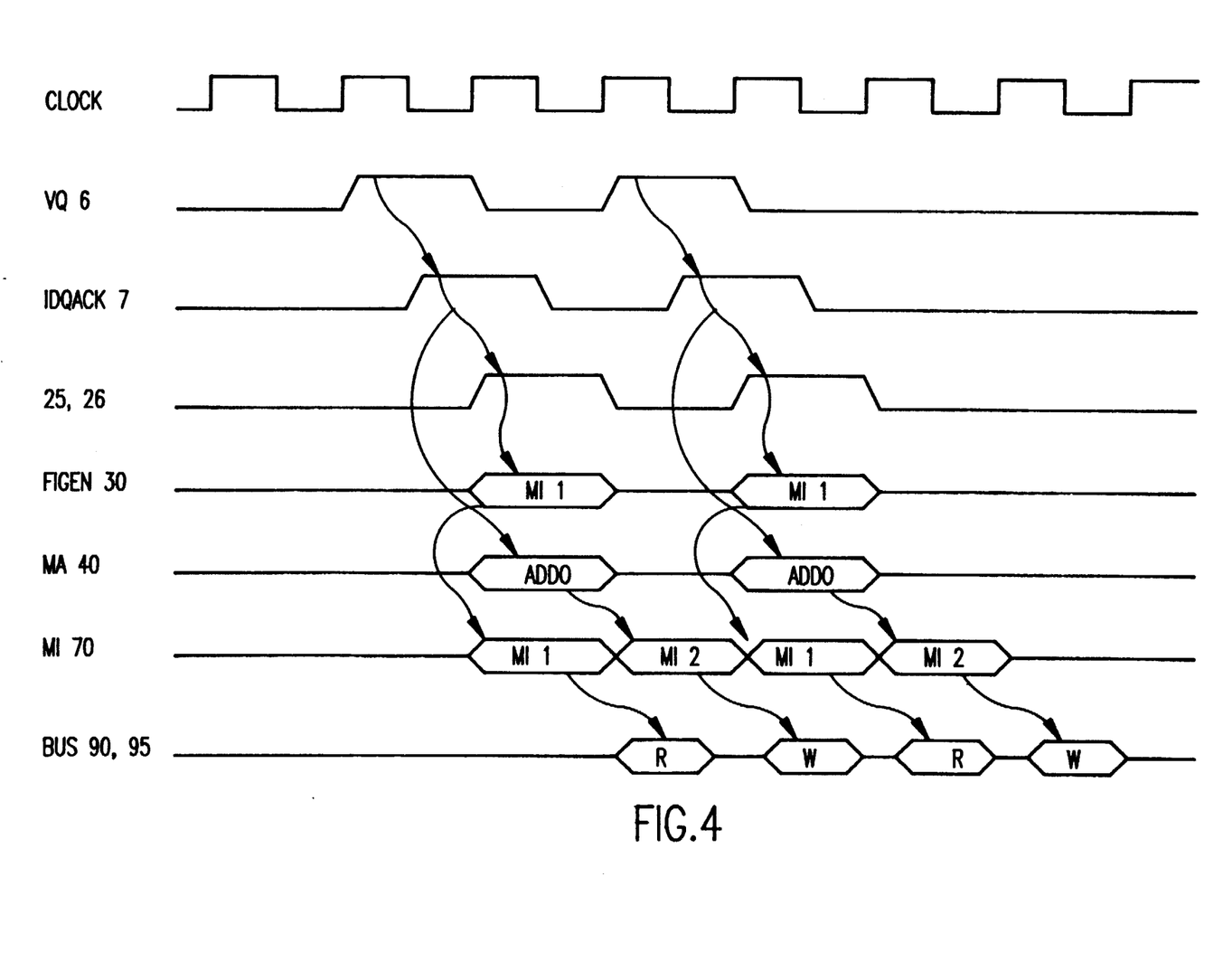
FIG. 4 is a timing chart representative of an operation of a microprogram controller shown in FIG. 1.

When all of the required information are stored in IDQ 10, IDU changes VQ 6 to the active level in synchronism with a clock signal CLOCK, as shown in FIG. 4. In response thereto, MISEQ 20 returns IDACK 7 to IDU at a timing when MICNT 80 is ready to execute the microinstruction string. MISEQ 20 further loads the content of STADQ 11, i.e. the address ADDO, to MA 40 via MPX 44 to initiate the microinstruction reading-out operation from MROM 50. At this time, the execution-enable information of SEQ 12 is decoded by a decoder 21 of MISEQ 20, so that the signals 25 and 26 are changed to an active high level during one clock period. Accordingly, the leading microinstruction MI1 is generated from FIGEN 30 and stored in MI 70 via SEL 60, as shown in FIG. 4. MICNT 80 thus starts to decode the leading microinstruction MI1. During the high level period of the signal 25 (26), the access to the address ADDO of MROM 50 is completed and the second microinstruction MI2 is thus read out therefrom onto the bus 55. In response to the change of the signal 26 to the low level, therefore, the second microinstruction MI2 is latched in MI 70 via SEL 60, as shown in FIG. 4. Simultaneously, the execution of the leading microinstruction MI1 starts, so that the source and destination operand data are fetched in MICNT 80 via the buses 90 and 95 and are subjected to the addition operation by ALU 83, as shown by "R" in FIG. 4. Since the macroinstruction in the present description is performed by two-step microinstruction, MPX 44 prevents the output of the incrementer 44 from being loaded to MA 40 in response to the signal 27. Since the microinstruction execution terminating command ENDM is transferred to MISEQ 20 via the bus 88, MISEQ 20 is ready to receive the next macroinstruction. Therefore, MISEQ 20 responds to VQ 6 which is generated during the microinstruction MI2 being latched in MI 70, and returns IDACK 7 to IDU. Assuming that this macroinstruction is also performed by the microinstruction string shown in FIG. 3, the signals 25 and 26 are again changed to the high level in response to a next clock, so that the leading microinstruction MI1 is latched in MI 70 via SEL 60. The address ADD0 is again loaded to MA 40. Simultaneously, the execution of the microinstruction MI2 starts, the addition resultant data is returned to the destination operand via MD-BUS 90, as shown by "W" in FIG. 4.

Thus, the leading microinstruction MI1 is latched in MI 70 before the microinstruction is read out of MROM 50 by MA 40 being loaded with the address of STADQ 11, and therefore the execution initiation of the microinstruction string is advanced to enhance the instruction execution speed.

In the case where the macroinstruction to be executed is not performed by the microinstruction string shown in FIG. 3, STADQ 11 has the address information for designating the leading microinstruction of a string of microinstructions corresponding to that macroinstruction, and SEQ 12 has "execution-disable" information. Accordingly, the signals 25 and 26 are held at the low level and the leading instruction is read out of MROM 50 and latched in MI 70 after one clock time elapses from a time point at which MA 40 is loaded with the address of STADQ 11.

As one of macroinstructions, there is a macroinstruction having an addressing mode accompanied with a register modification. For instance, a register modified data move macroinstruction is known in which the content of a particular register is used as an operand address and modified (i.e., incremented or decremented) by a predetermined value and the data accessed by the modified operand address is transferred to another register. In accordance with the present invention, the above register modification operation can be performed by a microinstruction generated by FIGEN. The microinstruction string for performing the register modification operation is described in FIG. 6, in which "MODREG" represent a register to be modified; "INCDEC" represents a command for setting ALU with an operation for incrementing or decrementing the content of the register to be modified by a predetermined value; "RESTART" represents a control command for starting the execution of a microprogram from an address designated by STADQ after the register modification operation is completed; and other marks are the same as those shown in FIG. 3. Specifically, by the leading microinstruction MI10 of the first step STEP1, the content of the register to be modified is transferred to TA 82 and then incremented or decremented by a modification value, and the operation resultant data is stored in ALUO 84. By the second microinstruction MI11 in the second step STEP2, the resultant data is returned to the register to be modified, and the required processing using the modified register is then initiated. Since the register modification operation shown in FIG. 6 is also performed by two-step microinstruction string, the leading microinstruction MI10 can be produced by FIGEN and executed simultaneously with the second microinstruction MI11 being read out of MROM.

Figure 5:
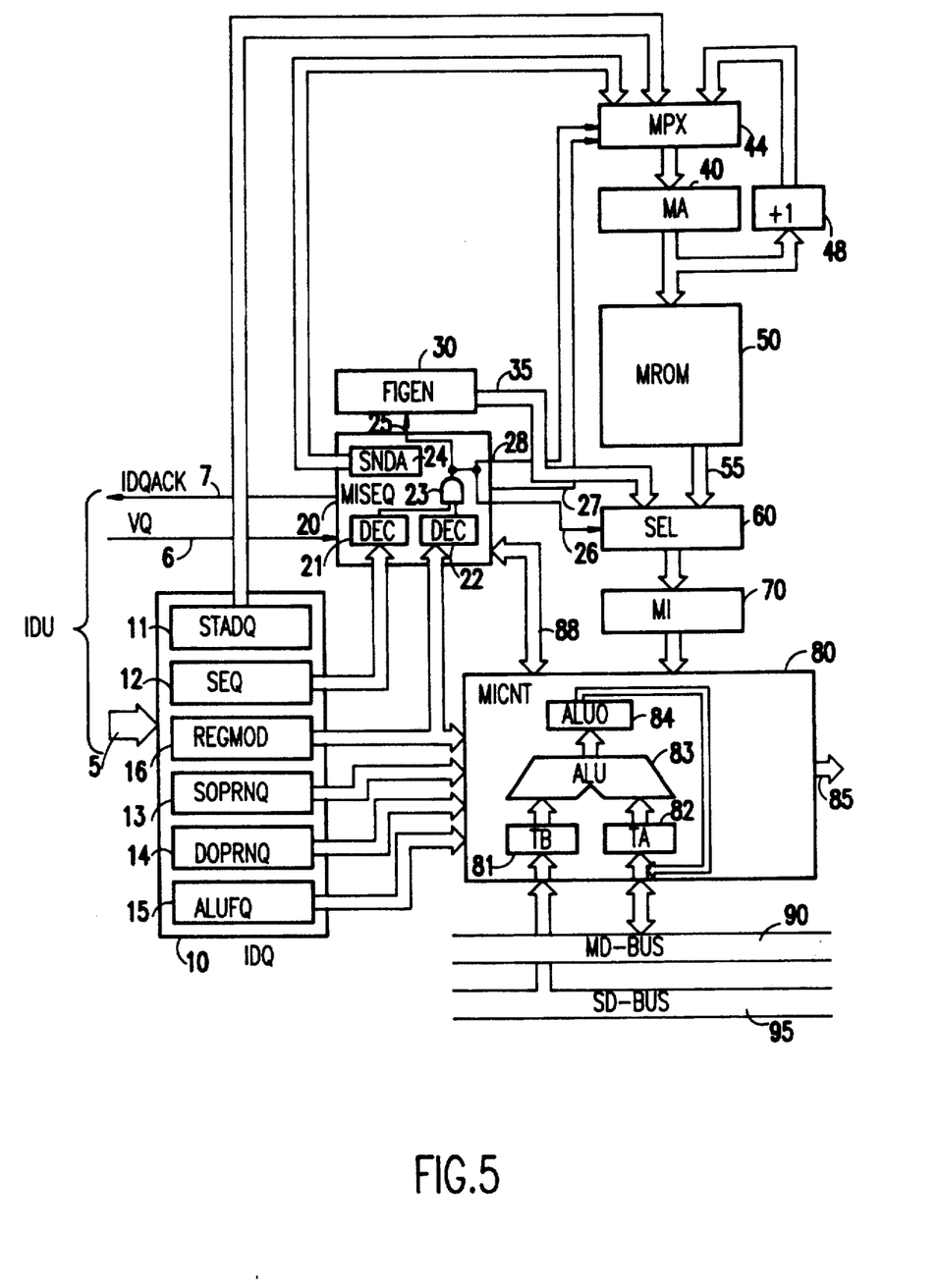
FIG. 5 is a block diagram representative of a second embodiment of the present invention.

A microprogram controller having such a construction is shown in FIG. 5 as a second embodiment of the present invention, in which the same constituents as those shown in FIG. 1 are denoted by the same reference numerals, and is omitted further description thereof. In this embodiment, register modification information (REGMOD) 16 is added to IDQ 10. REGMOD 16 includes information representing whether or not the register modification is required, a modification amount and a modification direction (increment or decrement). The first one of them is supplied to a second decoder 22 of MISEQ 20 and the remaining ones of them are supplied to MICNT 80. The decoder 21 produces logic 1 output in response to the execution-enable information of SEQ 12 and the decoder 22 produces logic 1 output in response to the information representing that the register modification is required. The outputs from the decoders 21 and 22 are supplied to an AND gate 23 whose output is in turn employed as the signals 25 and 26. FIGEN 30 generates a machine code representing the leading microinstruction MI10 shown in FIG. 6, in this embodiment. The second microinstruction MI11 is written in MROM 50 and address information ADD10 for accessing MI11 is previously stored in a register (SNDA) 24 of MISEQ 20. MPX 44 is of a three-input type and selects SNDA 24 in response to a signal 28 of an active high level and STADQ 11 in response to the high level signal 27. When both of the signals 27 and 28 are at the low level, MPX 44 selects the output of the incrementer 48. The signal 28 is also derived from the AND gate 23.

Figure 7:
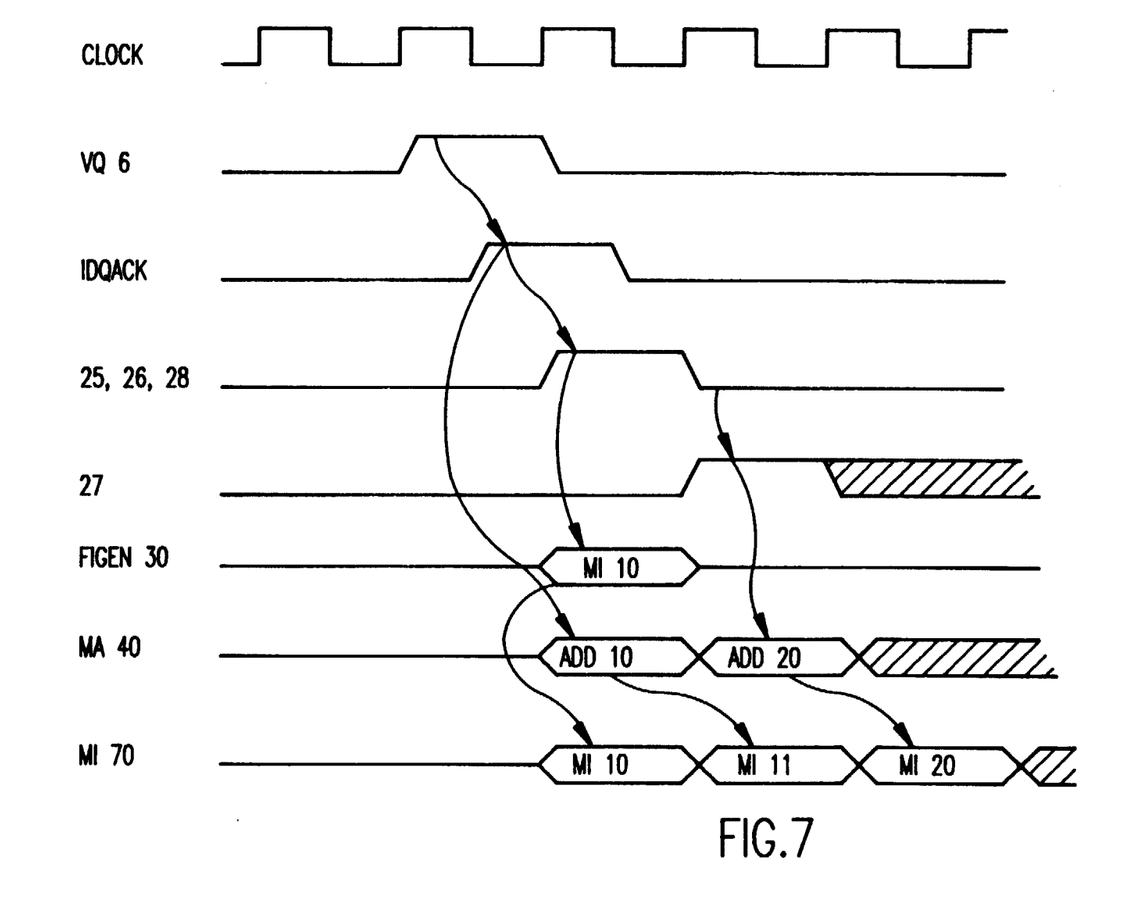
FIG. 7 is a timing chart representative of an operation of a microprogram controller shown in FIG. 5.

Assuming now that a macroinstruction having an addressing mode accompanied by the register modification is decoded, IDU changes VQ 6 to the high level when all of necessary information for this macroinstruction are read into in IDQ 10, as shown in FIG. 7. STADQ 11 has an address ADD20 of a microinstruction MI20 in MROM 50, which is executed by use of the modified register content. MISEQ 20 then returns IDQACK 7 to IDU to initiate the microprogram for the above macroinstruction. At this time, SEQ 12 has the execution-enable information and REGMOD 16 has the modification request information, and hence the signals 25, 26 and 28 are changed to the high level during one clock period. Consequently, the leading microinstruction MI10 from FIGEN 30 is latched in MI 70 via SEL 60 and the address ADD10 from SNDA 24 is loaded to MA 40 via MPX 44. By the change of the signals 25, 26 and 28 to the low level, the second microinstruction MI11 read out of MROM 50 is latched in MI 70 via SEL 60. Simultaneously, the signal 27 is changed to the high level, so that the address ADD20 of STADQ 11 is loaded to MA 40 via MPX 44. The microinstruction MI20 is thereby read out from MROM 50 and thereafter latched in MI 70 via SEL 60.

Figure 6:
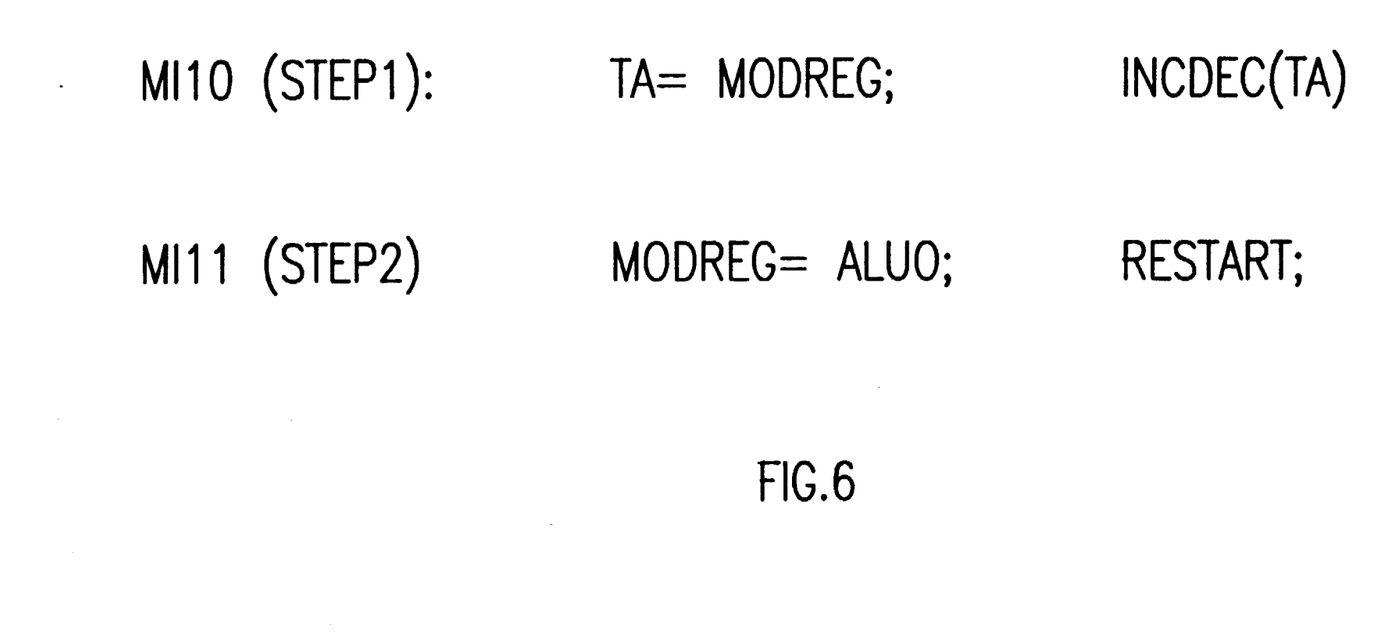
FIG. 6 is a program diagram indicating another string of microinstructions, the leading microinstruction of which is generated by FIGEN shown in FIG. 5.

Thus, the microprogram of FIG. 6 for performing the register modification operation is executed at the same time sequence as the typical microprogram shown in FIG. 3, and the microprogram for the macroinstruction accompanied by the register modification is initiated by RESTART control command.

Figure 8:
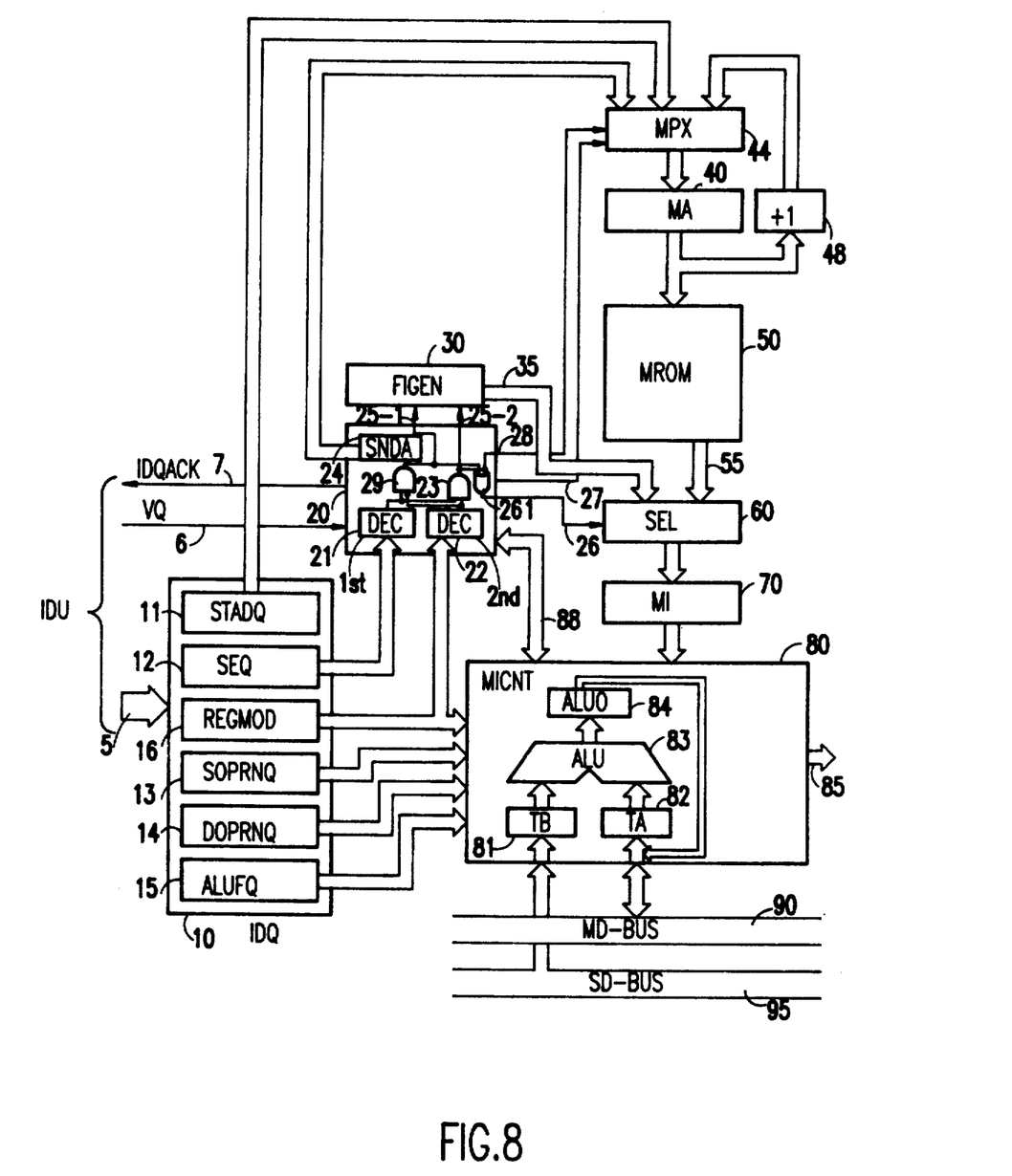
FIG. 8 is a block diagram representative of a third embodiment of the present invention.

Turning to FIG. 8, a microprogram controller according to a third embodiment of the present invention has both functions described in the above first and second embodiments. More specifically, FIGEN 30 generates both of the microinstruction MI1 of FIG. 3 and the microinstruction MI10 of FIG. 6 and supplies SEL 60 with the microinstruction MI1 when a signal 25-1 is at a high level and with the microinstruction MI10 when a signal 25-2 is at a high level. The signal 25-1 is produced by an AND gate 29 receiving the output of the decoder 21 and the inverted output of the decoder 22, and the signal 25-1 is produced by the AND gate 23. An OR gate 26-1, which receives the signals 25-1 and 25-2, produces the selection signal 26 for SEL 60. Accordingly, the microprogram controller of this embodiment performs the same operation as the first embodiment when the macroinstruction to be executed is performed by the microinstruction string of FIG. 3 and as the second embodiment when the macroinstruction to be executed has an addressing mode accompanied by the register modification.

Other than the two macroinstructions mentioned above, there are various macroinstructions such as a compare macroinstruction in which a comparison resultant data is not returned back to the destination operand, a single operand macroinstruction in which a single operand data is added or subtracted with a constant "1" and that resultant data is returned back to the destination operand, a data transfer macroinstruction between two registers, between a register and a memory or between two addresses of a memory, and a no-operand macroinstruction such as a branch instruction. FIGEN 30 may be thus constructed to generate respective leading microinstructions of microinstruction strings corresponding respectively to those macroinstructions. However, a memory cell array structure is required in order to generate a plurality of microinstructions, so that the effect of FIGEN 30 is deteriorated.

Therefore, description will be made below on the constructions for executing the macroinstructions such as a compare macroinstruction, a single operand macroinstruction and so forth by utilizing the microinstruction string shown in FIG. 3. It should be noted that only features are described in the following in order to avoid the redundancy of explanation and drawing, and other constituents are referenced to FIG. 1.

Figure 9:
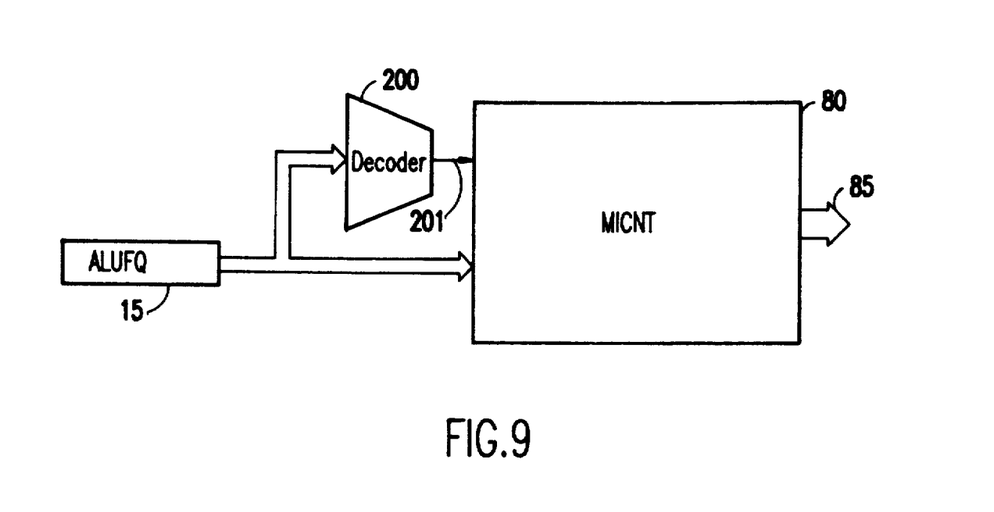
FIGS. 9 to 12 are block diagrams representative of the respective main parts of modifications of the microprogram controller shown in FIG. 1.

FIG. 9 is for a compare macroinstruction, when this macroinstruction is decoded, "compare operation" information is stored in IDQ 10 as ALUFQ 15. This information is decoded by a decoder 200, so that a SD-BUS write inhibite signal 201 takes an active level. By the microinstruction MI1, a compare operation is performed on two operand data to be compared. In the execution of the next microinstruction MI2, since the SD-BUS write inhibite signal 201 is at the active level, the control signal 85 for returning the comparison resultant data back to the destination operand is not generated, so that the microprogram is terminated without the result data being written in the destination operand. On the other hand, the inactive level of the SD-BUS write inhibit signal 201 causes MICNT 80 to write the resultant data into the destination operand.

Figure 10:
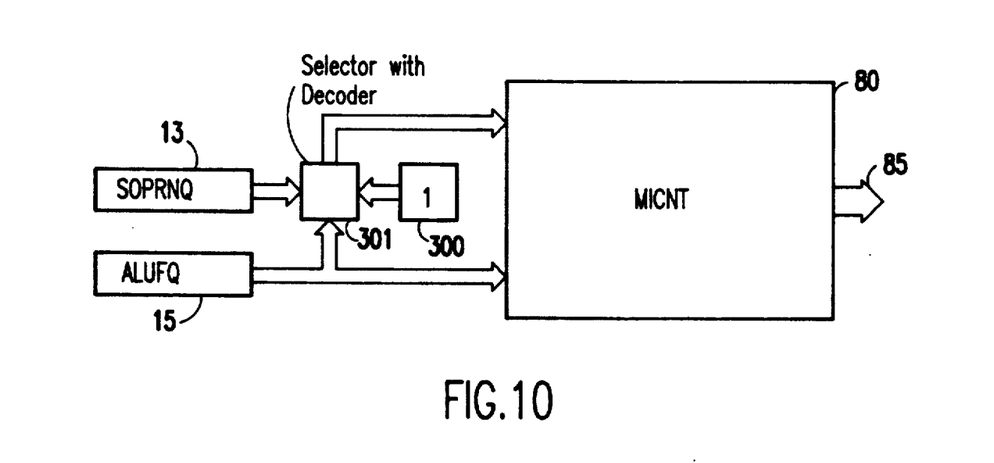

FIG. 10 is for a single operand macroinstruction in which the constant "1" is added to or subtracted from the operand data. In this macroinstruction, ALUFQ 15 has information of "addition/subtraction operation of 1". This information is decoded by a decoder 300 when the microprogram shown in FIG. 3 is initiated. The decoder 300 includes a selector and thus selects a constant "1" generator 300 in place of SOPRNQ 13. By the microinstruction MI1, therefore, the constant "1" is added to or subtracted from the destination operand data, and thereafter, the resultant data is returned to the destination operand by the microinstruction MI2.

Figure 11:
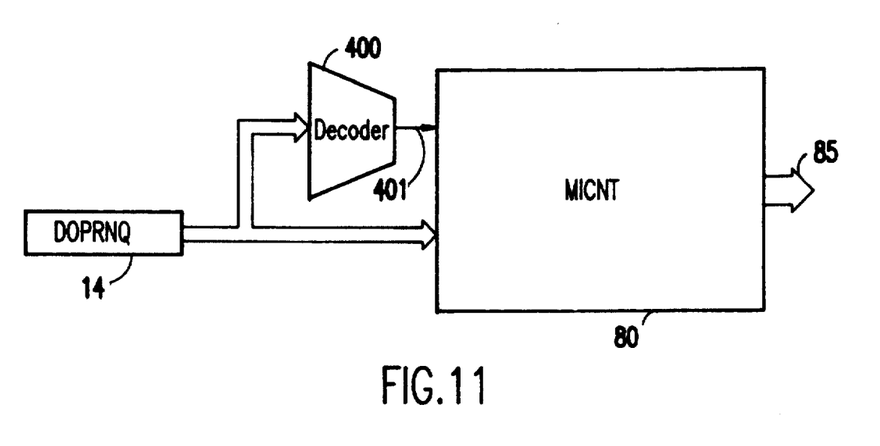

FIG. 11 is for a data transfer macroinstruction. In this instruction, DOPRNQ 14 has "read-disable" information in addition to operand destination information. A decoder 400 decodes the read-disable information and changes a SD-BUS read inhibite signal 401 to an active level. In the execution of the microinstruction MI1, since the signal 401 is at the active level, the control signal 85 for reading out the destination operand data is not generated. ALU 83 thereby performs a designated operation on the source operand data from MD-BUS 90 and invalid data left in TB 81. However, in the data transfer macroinstruction, such an operation is designated that does not influence the destination data. For example, an operation for outputting the source data as it is or for deriving 2's complement of the source data is designated. Therefore, ALU 83 produces correct data. This data is then transferred to the destination operand of DOPRNQ 14, by the second microinstruction MI2.

Figure 12:
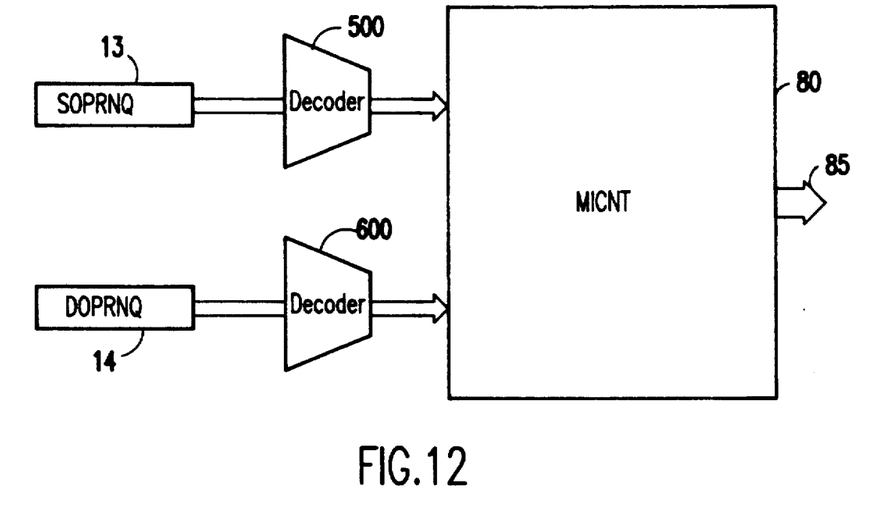

FIG. 12 is for a no-operand macroinstruction such as a branch instruction. In such a macroinstruction, both of SOPRNQ 13 and DOPRNQ 14 has "invalid operand" information. First and second decoders 500 and 600 transfer SOPRNQ 13 and DOPRNQ 14 respectively to MICNT 80 as they are when the invalid operand information is not detected. On the other hand, when the invalid operand information is detected, the decoders 500 and 600 convert SOPRNQ 13 and DOPRNQ 14 respectively into information designating an internal resource that does not influence the execution of a microprogram. For example, MD-BUS 90 and SD-BUS 95 are designated. In this case, MD-BUS 90 and SD-BUS 95 are subjected to some operation as source and destination operands and the resultant data is applied to SD-BUS 95. Thus, substantial operand data is not designated.

It is apparent that the present invention is not limited to the above embodiments, but may be changed and modified without departing from the scope and spirit of the invention.

What is claimed is:

1. A microprogram controller comprising a memory for storing microinstructions, a first register for temporarily storing address information for accessing said memory, a second register for temporarily storing a microinstruction to be executed, an execution unit for receiving and executing a microinstruction from said second register, a generator for generating a leading microinstruction of a predetermined microinstruction string consisting of at least two microinstructions, a selector coupled to said memory and said generator for selecting one of a microinstruction read out of said memory and said leading microinstruction generated from said generator and for supplying the selected microinstruction to said second register, and means for controlling said selector to select said leading microinstruction before a microinstruction is read out of said memory by said first register being loaded with predetermined address information and thereafter for controlling said selector to select the microinstruction read out of said memory, wherein said means for controlling said selector to select said leading microinstruction before a microinstruction is read out of said memory comprises:
- a microinstruction sequencer including a first decoder providing first control signals, said microinstruction sequencer providing signals to said generator and said selector; and
- a decoded instruction queue for storing address information, source operand information, destination operand information, operational information, and sequence control information, said address information being supplied to said first register, said source operand information, said destination operand information and said operational information being supplied to said execution unit, and said sequence control information being supplied to said decoder of said microinstruction sequencer, further including sequencing means responsive to said microinstruction sequence controller for incrementing said address information in said first register to sequentially read out a series of microinstructions stored in said memory, wherein said sequencing means comprises:
  incrementing means for adding one to said address in said first register to produce an incremented address; and
  multiplexer means responsive to a multiplex control signal from said microinstruction sequencer for selecting either said address information in said decoded instruction queue or said incremented address, wherein said decoded instruction queue further stores information representing whether or not register modification is required for a particular microinstruction, a modification amount and a modification direction, said information on modification amount and modification direction being supplied to said execution unit, said microinstruction sequencer further comprising:
- a second decoder responsive to said information in said decoded instruction queue representing whether or not register modification is required providing second control signals;
- a first AND gate for logically ANDing said first and said second control signals to produce said signals to said generator and said selector; and
- a third register for temporarily storing a second microinstruction of a macroinstruction for register modification, said multiplexing means being responsive to said signals from said first AND gate and to said multiplex control signals for selecting one of said second microinstruction, said address information in said decoded instruction queue or said incremented address.

2. The microprogram controller recited in claim 1 wherein said microinstruction sequencer further comprises a second AND gate for logically ANDing said first control signal and an inverse of said second control signal to produce a signal which is supplied to said generator, and an OR gate for logically ORing signals from said first and second AND gates to produce signals to said selector.

3. A microprogram controller comprising a memory for storing microinstructions, a first register for temporarily storing address information for accessing said memory, a second register for temporarily storing a microinstruction to be executed, and execution unit for receiving and executing a microinstruction from said second register, a generator for generating a leading microinstruction of a predetermined microinstruction string consisting of at least two microinstructions, a selector coupled to said memory and said generator for selecting one of a microinstruction read out of said memory and said leading microinstruction generated from said generator and for supplying the selected microinstruction to said second register, and means for controlling said selector to select said leading microinstruction before a microinstruction is read out of said memory by said first register being loaded with predetermined address information and thereafter for controlling said selector to select the microinstruction read out of said memory,
- a memory for storing a plurality of microinstructions,
- a generator for generating a leading microinstruction of a predetermined microinstruction string consisting of at least two microinstructions, said memory storing a second microinstruction of said predetermined microinstruction string,
- a first register for temporarily storing address information,
- means for reading out a microinstruction from an address of said memory designated by the address information stored in said first register,
- a selector coupled to said memory and said generator for selecting one of a microinstruction read out of said memory and said leading microinstruction from said generator,
- a second register for temporarily storing the selected microinstruction from said selector,
- an execution unit for receiving and executing the microinstruction from said second register,
- means for detecting that a macroinstruction to be executed is performed by said microinstruction string and for producing a detection signal, and
- means for controlling said selector to select said leading microinstruction from said generator before said microinstruction is read out of said memory and thereafter to select said second microinstruction read out of said memory,
- wherein said means for detecting that a macroinstruction to be executed is performed by said predetermined microinstruction string comprises
  - a microinstruction sequencer including a first decoder providing first control signals, said microinstruction sequencer providing signals to said generator and selector, and
  - a decoded instruction queue for storing address information, source operand information, destination information and sequence control information, said address information being supplied to said first register, said source operand information, said destination being supplied to said execution unit, and said sequence control information being supplied to said decoder of said microinstruction sequencer, wherein said execution unit comprises:
    - first and second input registers respectively temporarily storing source and destination operand data;
    - a first data bus connected to said first input register for supplying said source operand data designated by said source operand data in said decoded instruction queue;
    - a second data bus connected to said second input register for supplying and receiving said destination operand data designated by said destination operand data in said decoded instruction queue;
    - an arithmetic and logic unit connected to receive the data stored in said first and second input registers for performing an operation designated by said operational information in said decoded instruction queue;

an output register temporarily storing resultant data from said arithmetic and logic unit and returning said resultant data to said second data bus; and a control bus connected between said means for detecting and said execution unit for delivering an execution start signal to said execution unit and returning an execution completion signals to said means for detecting, said microprocessor further including sequencing means responsive to said microinstruction sequence controller for incrementing said address information in said first register to sequentially read out a series of microinstructions stored in said memory, said sequencing means comprising:

incrementing means for adding one to said address in said first register to produce an incremented address; and multiplexer means responsive to a multiplex control signal from said microinstruction sequencer for selecting either said address information in said decoded instruction queue or said incremented address wherein said decoded instruction queue further stores information representing whether or not register modification is required for a particular microinstruction, a modification amount and a modification direction, said information on modification amount and modification direction being supplied to said execution unit, said microinstruction sequencer further comprising;

a second decoder response to said information in said decoded instruction queue representing whether or not register modification is required providing second control signals;

a first AND gate for logically ANDing said first and said second control signals to produce said signals to said generator and said selector; and a third register for temporarily storing a second microinstruction of a macroinstruction for register modification, said multiplexing means being responsive to said signals from said first AND gate and to said multiplex control signal for selecting one of said second microinstruction, said address information in said decoded instruction queue or said incremented address.

4. The microprocessor recited in claim 3 wherein said microinstruction sequencer further comprises a second AND gate for logically ANDing said first control signal and an inverse of said second control signal to produce a signal which is supplied to said generator, and an OR gate for logically ORing signals from said first and second AND gates to produce signals to said selector.

* * * * *